Jan. 20, 1970  P. J. F. O'REILLY ET AL  3,490,406
STABILIZED COLUMN PLATFORM
Original Filed Sept. 30, 1966  9 Sheets-Sheet 1

INVENTORS
PETER J.F. O'REILLY
HARRY W. REINEKE, JR.

BY Cushman, Darby & Cushman
ATTORNEYS

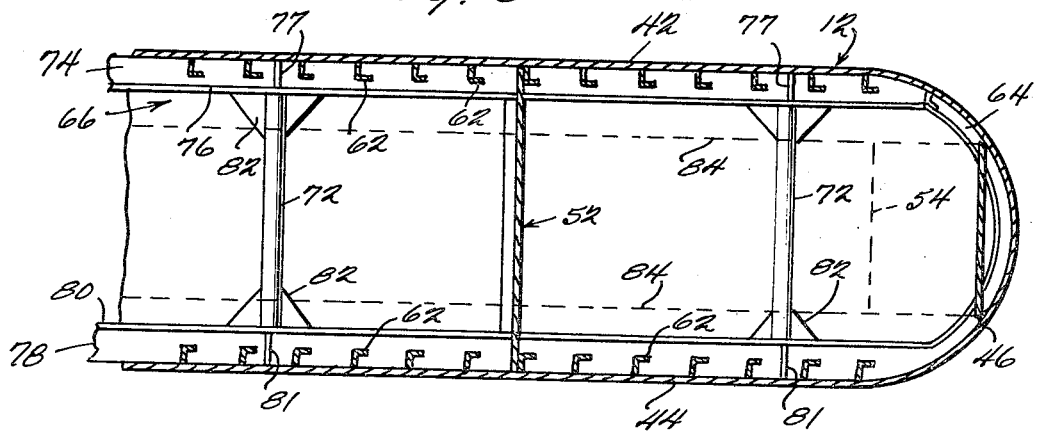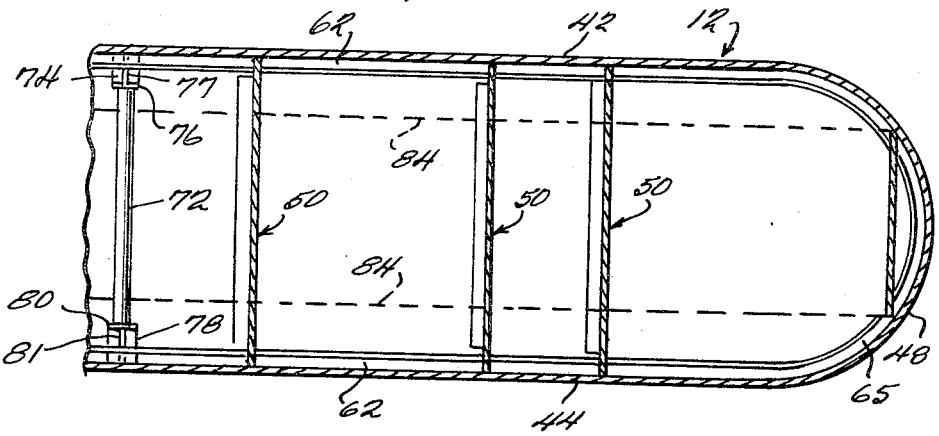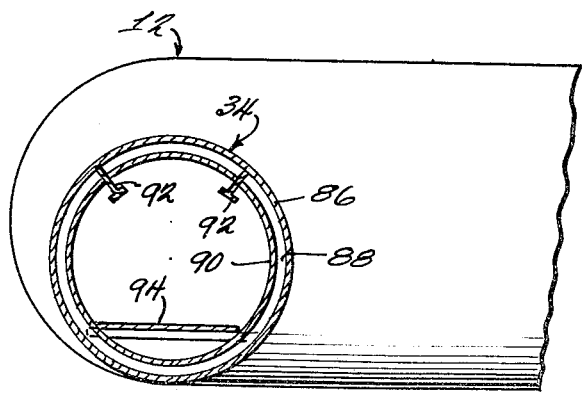

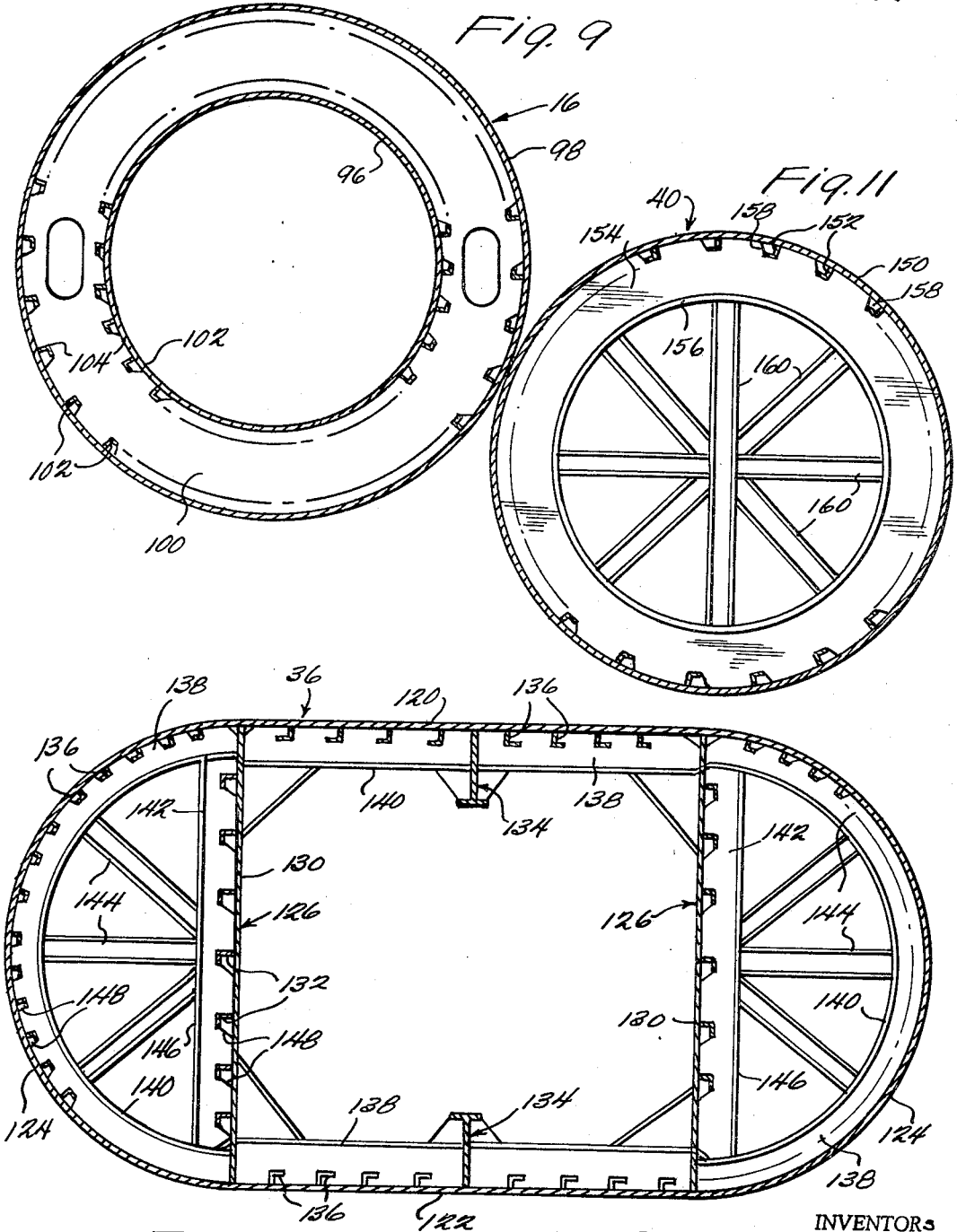

Jan. 20, 1970  P. J. F. O'REILLY ET AL  3,490,406
STABILIZED COLUMN PLATFORM
Original Filed Sept. 30, 1966  9 Sheets-Sheet 6
Fig. 12
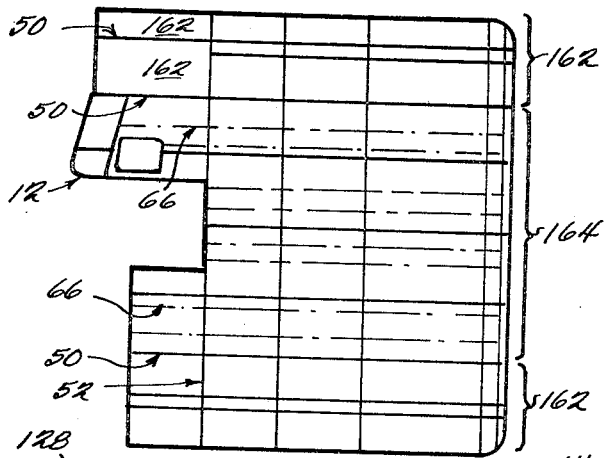
Fig. 13
Fig. 14
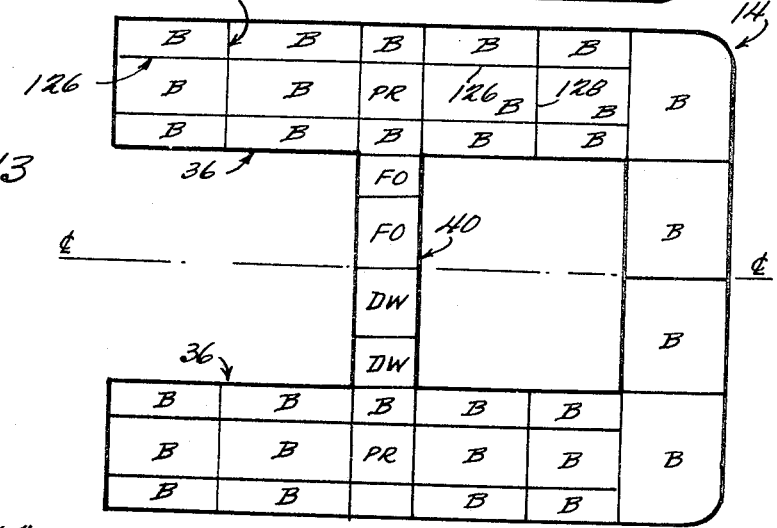
Fig. 15
WIND AND WAVE DIRECTION-180°
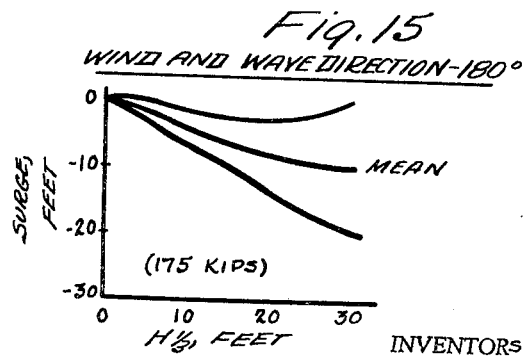
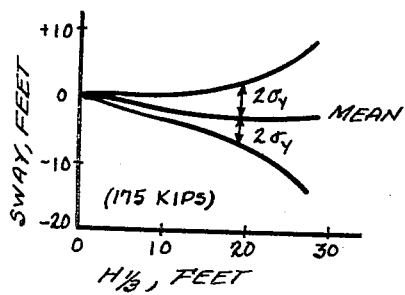
WIND AND WAVE DIRECTION
90°
INVENTORS
PETER J.F. O'REILLY
HARRY W. REINEKE, JR.
BY
Cushman, Darby & Cushman
ATTORNEYS

WAVE DIRECTION -30° OFF BOW

INVENTORS
PETER J. F. O'REILLY
HARRY W. REINEKE, JR.

BY
ATTORNEYS

WAVE DIRECTION – BOW ON
Fig. 20
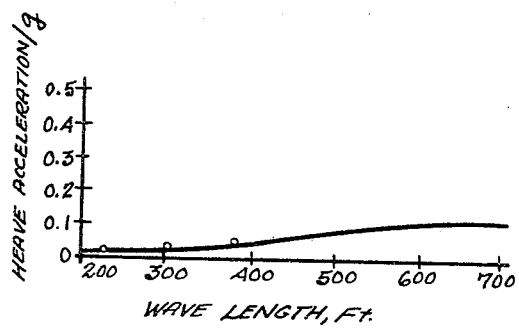
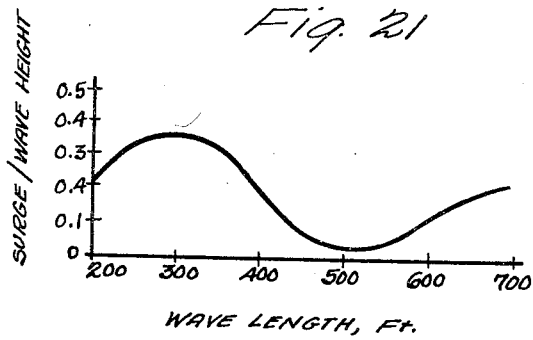
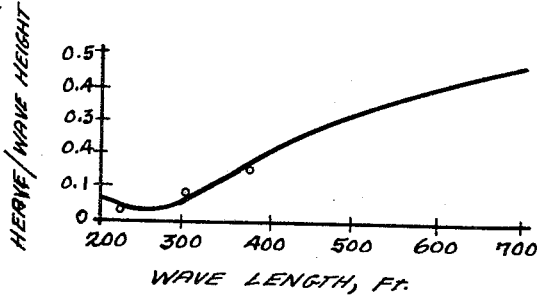
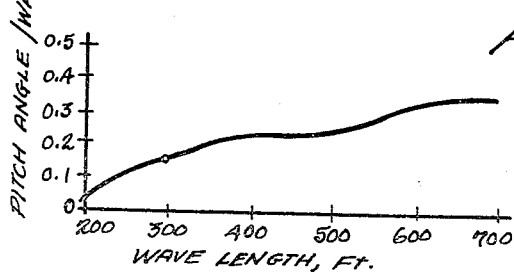

WAVE DIRECTION — BEAM SEA

INVENTORS
PETER J.F. O'REILLY
HARRY W. REINEKE, Jr.

BY Cushman, Darby & Cushman
ATTORNEYS

United States Patent Office 3,490,406
Patented Jan. 20, 1970

3,490,406
STABILIZED COLUMN PLATFORM
Peter J. F. O'Reilly, Wichita, Kans., and Harry W. Reineke, Jr., New Orleans, La., assignors to The Offshore Company, Houston, Tex., a corporation of Delaware
Continuation of application Ser. No. 694,750, Dec. 29, 1967, which in turn is a continuation of application Ser. No. 583,199, Sept. 30, 1966. This application Aug. 23, 1968, Ser. No. 768,578
Int. Cl. B63b 35/44
U.S. Cl. 114—.5        5 Claims

ABSTRACT OF THE DISCLOSURE

An offshore vessel having a platform with two hulls. A plurality of tapered stabilizing columns interconnect the platform and the hulls.

This application is a continuation of application Ser. No. 694,750, filed Dec. 29, 1967, now abandoned, which was a continuation of application Ser. No. 583,199, filed Sept. 30, 1966, now abandoned.

This invention relates to a floating platform for use as an offshore drilling platform, radar station, landing platform or the like. In particular it relates to a floating platform embodying constructional features which render it highly resistant to storm damage and highly stabilized against movement resulting from wind, water motion and changes in the magnitude and distribution of the live load.

Floating drilling platforms or barges of the kind under consideration are employed for deep water work where bottom-supported platforms are impractical. Typically, these floating platforms are constructed in the form of a lower hull, an above-water superstructure and intermediate buoyant supporting means, usually including hollow vertical columns, interconnecting the lower hull with the superstructure. When the platform is to be made operational, the lower hull or the columns are ballasted with sea water so that the platform sinks in the water until the lower hull becomes completely submerged. At this time the sealed, hollow support columns, or stabilizing columns as they are generally referred to, become partially submerged, and by virtue of their buoyancy they support the platform in a position at which the superstructure is still at an elevation well above normal wave height. This basic design is advantageous from the standpoint of buoyant stability, because the vertical, horizontal and angular movements of the platform during use are less than for a conventional ship's hull under the same conditions. Maximum buoyant stability is one of the primary goals of all current platform designs. The platform must be as resistant as possible to upset by storms in order to prevent loss of life and to prevent loss of the platform itself which may represent an investment of up to ten million dollars. In addition, the platform must be as resistant as possible to movement by wind and wave action in order that drilling operations may be carried out with a minimum of downtime resulting from high seas. The cost of operating a large platform is of the order of $10,000 per day, and it is therefore important that drilling operations not be interrupted by undue relative movement between the platform and the submerged well site.

It is also important that the platform offer as little resistance as possible to towing and that it exhibit low yaw tendencies during towing. Here again economic considerations require that the platform be moved from one location to another as fast as possible.

The term "buoyant stability" refers to the ability of the platform to resist the horizontal, vertical and angular movements of a floating body including both the movements which may be impressed on the body by external forces and the natural movement occurring after an external force has been impressed or removed. The impressed movements result from the force of wind and waves on the platform and from changes in the distribution and magnitude of loads on the deck during drilling operations. The natural movements occur after any change in these external forces. It is well recognized that these movements may be classified into six freedoms of motion which are identified as surge, sway, yaw, heave, roll and pitch. From the standpoint of drilling operations, motions in the fore and aft, side-to-side and up and down directions are regarded as the most important motions to be minimized, because these motions create relative movements between the floating platform and the pipe which is anchored to the submerged bottom.

Referring more specifically to the movements which may be impressed on a floating drilling barge, it is well recognized that these movements result primarily from the following sources: the action of wind on the above-water portion of the barge; the action of water, particularly the rise and fall of waves and swells on the submerged portion of the barge; changes in the magnitude of the live load supported by the barge, such as occurs when a drill string is released or picked up by the derrick; and changes in the distribution of the load on the barge.

The natural movement of a floating structure is the pitch and roll of the structure which occurs after the structure has been disturbed by wind or water. It is highly important that the natural frequency of pitch and roll not coincide with wave frequency, because this situation can lead to excessive movement of the structure and possibly to upset. The structure, therefore, should be transparent to waves in the sense that its response to wave motion does not lead to resonance between motion of the structure and wave motion.

It is the primary object of the present invention to provide a floating platform or the like which has good towing characteristics, improved resistance to storm damage and improved buoyant stability, these improvements being realized as a result of a combination of special constructional features relating to the superstructure, the stabilizing columns and the lower hull.

It is a more specific object of the present invention to provide a floating platform or the like having a lower hull constructed with flat upper and lower surfaces to resist heave when submerged and shaped to have good wave transparency when afloat, a superstructure constructed as a watertight hull and providing an enclosed space for living quarters and auxiliary drilling equipment, and a plurality of buoyant stabilizing columns interconnecting and sealed from the upper and lower hulls, the columns being of special shape and spacing to achieve high wave transparency and high natural periods of motion when partially submerged, the entire platform being free of external truss supports.

The invention will be further understood from the following detailed description taken with the drawings which are schematic and in which:

FIGURE 1 is a perspective view of a floating drilling platform embodying the principles of the present invention;
FIGURE 2 is a top plan view of the platform;
FIGURE 3 is a side elevational view of the platform;
FIGURE 4 is a front elevational view of the platform;
FIGURES 5 and 6 are fragmentary sectional views, on an enlarged scale, taken generally on the longitudinal lines 5—5 and 6—6, respectively, of FIGURE 2;

FIGURE 7 is a fragmentary sectional view, on an enlarged scale, taken generally on the transverse line 7—7 of FIGURE 2;

FIGURE 8 is a sectional view, on an enlarged scale, taken on the line 8—8 of FIGURE 2;

FIGURE 9 is a horizontal sectional view, on an enlarged scale, through a stabilizing column taken on the line 9—9 of FIGURE 3;

FIGURE 10 is a transverse sectional view, on an enlarged scale, taken on the line 10—10 of FIGURE 3;

FIGURE 11 is a radial sectional view, on an enlarged scale, of the stabilizing cylinder of the lower hull;

FIGURES 12 and 13 are schematic views showing the location of bulkheads in the upper and lower hulls, respectively; and FIGURES 14–27 are graphs showing various motion characteristics of the platform.

Figure 1:
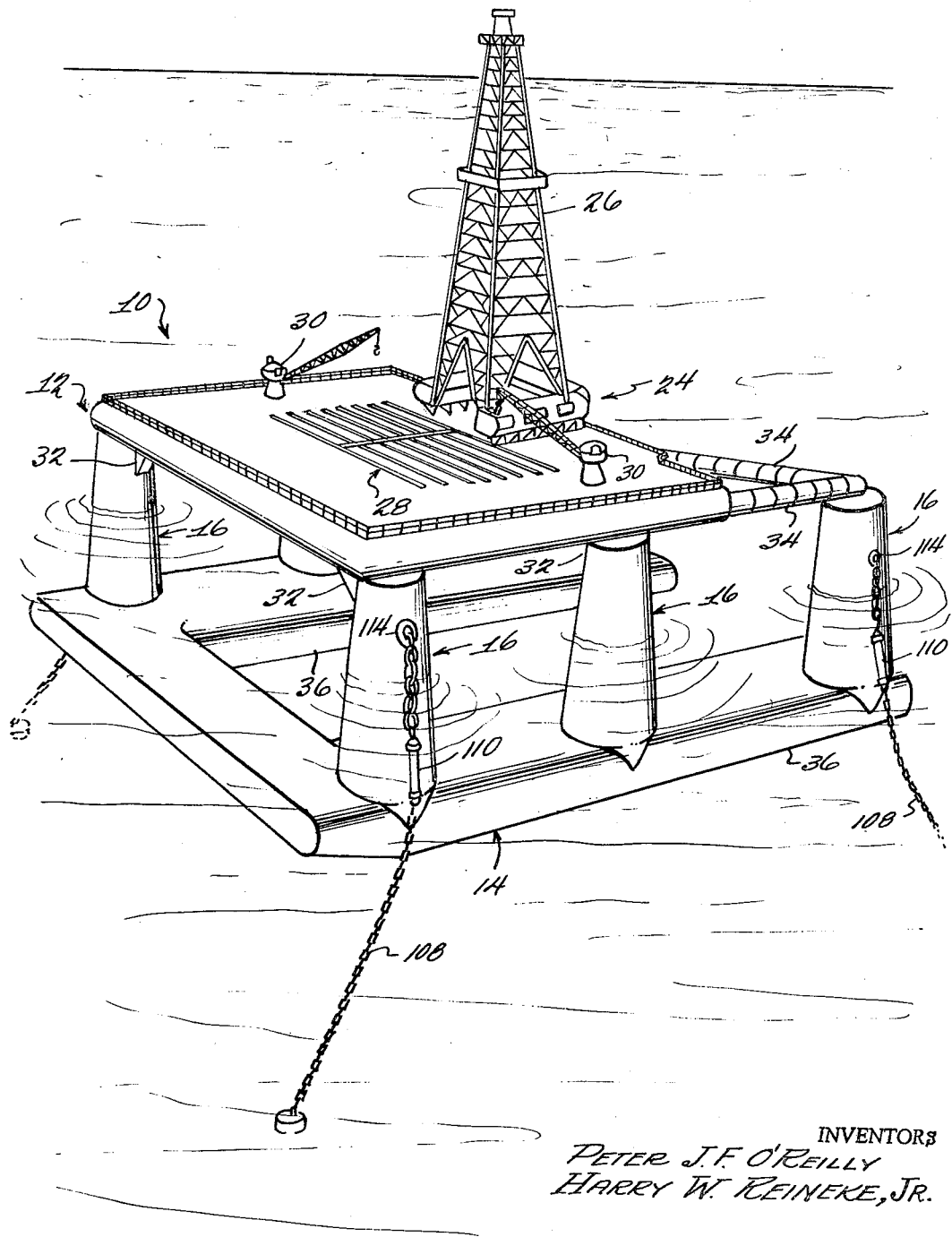

Referring to FIGURES 1–5, there is shown a floating drilling platform 10 which embodies the principles of the present invention. The platform comprises an upper watertight hull 12, a lower watertight hull 14 and a plurality of hollow stabilizing columns 16, six in this instance, interconnecting the hulls. The hulls 12 and 14 and the stabilizing columns 16 are each constructed in the form of a box girder. That is, each of these parts is formed of a continuous skin, in this case steel plates welded to each other along adjoining edges, and interior bulkheads or equivalent structure secured at their edges to the inner surface of the skin. This type of construction renders each part highly rigid and imparts high rigidity to the entire platform. As a result, no external truss supports are employed, and this feature is important in that it reduces the force exerted against the platform by wind. The effect is more than a mere reduction in actual surface area, because at high air velocities a conventional criss-cross truss support arrangement offers much the same resistance as a continuous surface of equal overall size. In addition, the box-girder type of construction effects a high strength-to-weight ratio with the result that the total weight of the platform is considerably less than for a platform of similar configuration and of the same size employing conventional external truss supports.

Figure 3:
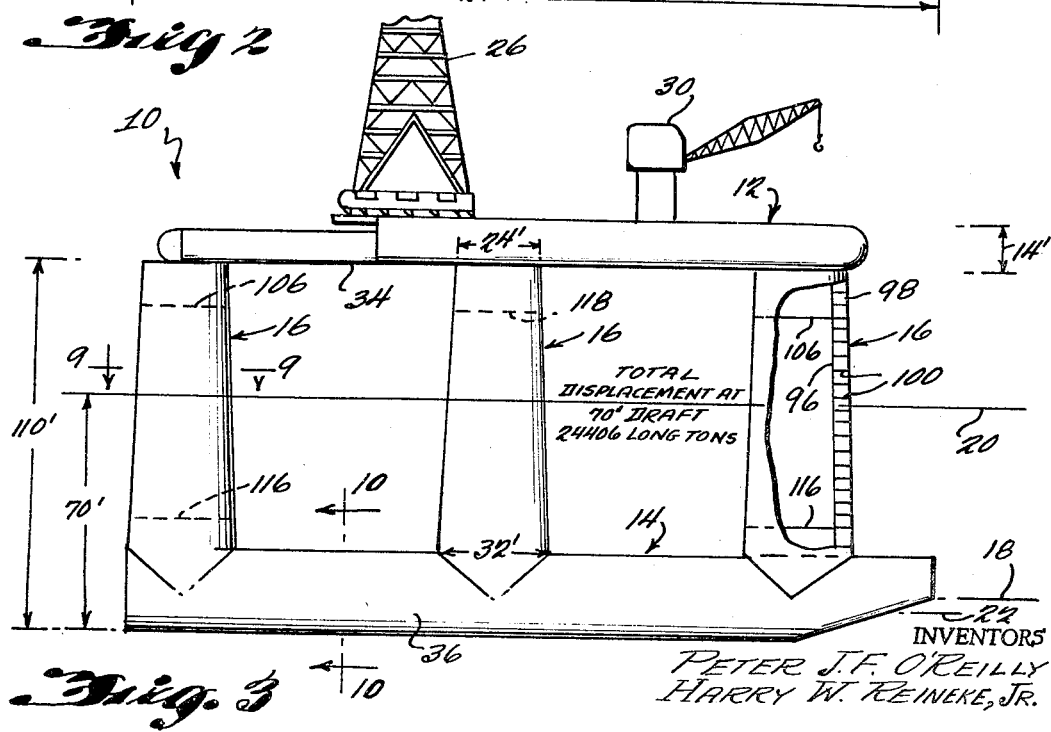
Figure 4:
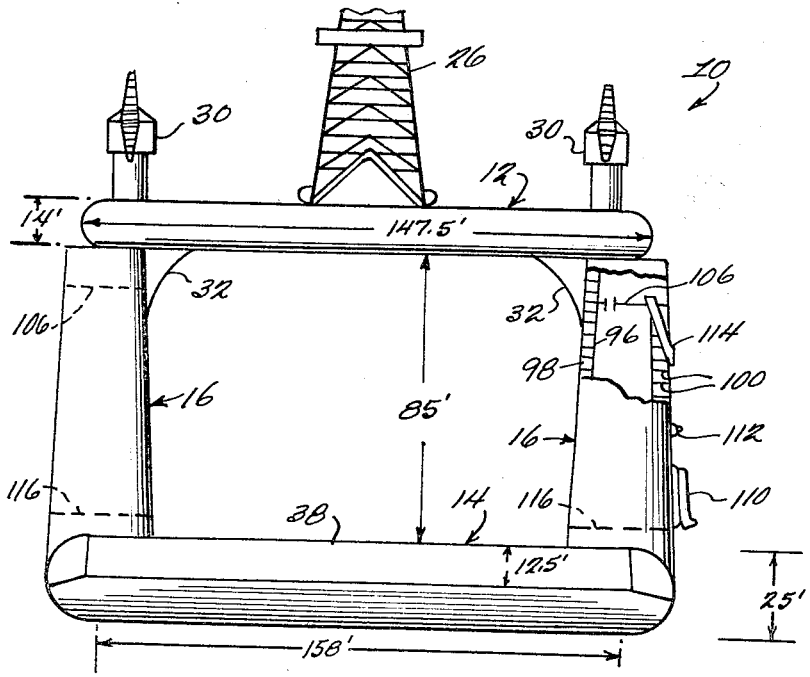

The platform 10, like other buoyant platforms designed for deep water drilling operations, is adapted to float on the water surface when being towed to location and to be partly submerged when operational. To this end the lower hull 14 is divided interiorly into a number of ballast tanks which may be filled with and emptied of sea water by means of suitable pumps. In FIGURES 3 and 4 the draft of the platform 10 when fully floated is shown by the line 18, and the draft when ballasted to an operational position is shown by the line 20. When the platform 10 is being towed, its forward end will rise slightly, the draft being shown by the line 22 in FIGURE 3. The stabilizing columns 16 are unballasted hollow members of double wall construction and are sealed at each end so as not to communicate with the upper and lower hulls 12 and 14.

Figure 2:
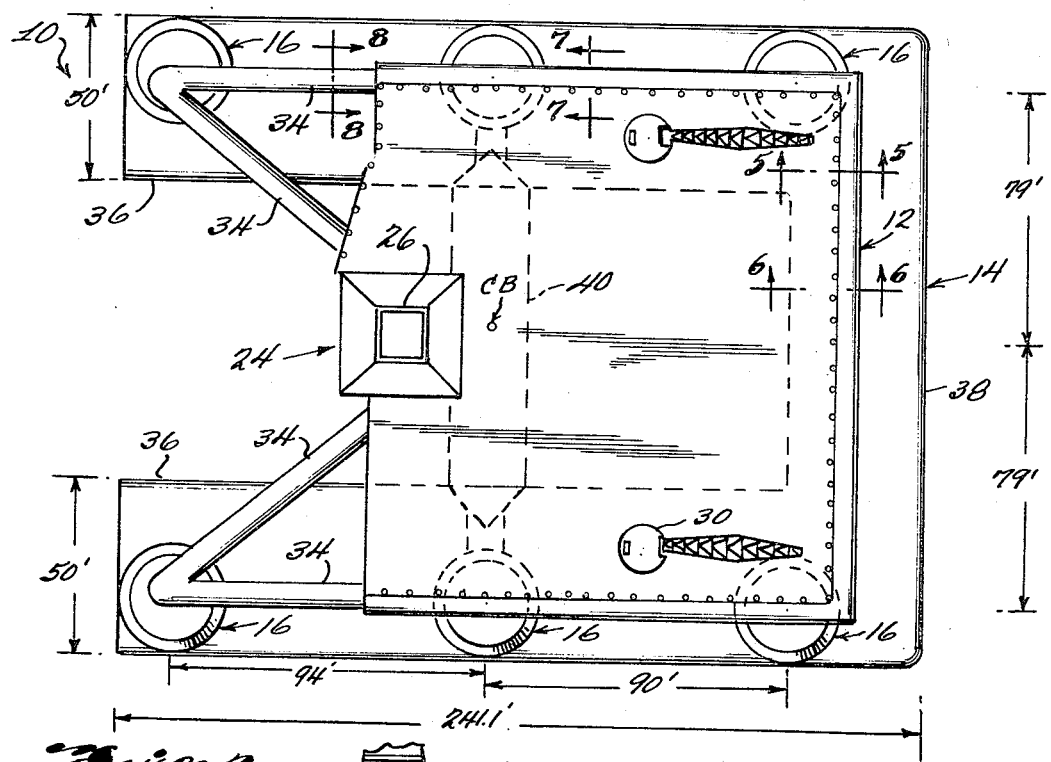

The upper surface of the upper hull 12 is relatively unencumbered inasmuch as crew quarters, offices and much of the equipment employed for drilling wells are located within the box girder construction which defines the upper hull 12. This feature further reduces the resistance of the platform 10 to wind forces. As seen in FIGURES 1 and 2, the aft end of the upper hull 12 is provided with a drilling slot 24 over which a derrick 26 is mounted, the derrick 26 including the usual draw works and rotary table. Also provided on the upper surface of the upper hull are a pipe rack 28 and service cranes 30.

The stabilizing columns 16 are of double-wall construction, circular in horizontal section, and are tapered inwardly and upwardly throughout their entire length. The lower ends of the columns 16 are welded at their peripheries to the upper surface of the lower hull 14. The upper ends of the four forwardmost columns 16 are welded along their peripheries to the lower surface of the upper hull 12. A generally triangular gusset 32, also of box-girder construction, is provided inboard of each junction. Each of the two aft columns 16 is joined at its upper end to a horizontal support member 34 extending from the aft end of the upper hull 12. These support members 34 are constructed in the form of large diameter cylindrical tubes which offer little wind resistance yet which provide good rigidity.

The lower hull 14, like the upper hull 12, is constructed of steel plates welded together to provide upper, lower and side skins and is provided with internal longitudinal and transverse bulkheads. The hull includes two spaced-apart, pontoon-like members 36 and a transverse bow member 38 joining the forward ends of the pontoon-like members 36. A transverse stabilizing cylinder 40 joins the pontoon-like members intermediate their ends. The aft ends of the pontoon-like members 36 provide space between them so that the drilling slot 24 of the barge can be moved easily into alignment with a well site and subsequently moved away from the well head. The configuration of the pontoon-like members 36 and the bow member 38 is of special design for improved stability, as will be discussed hereinafter.

The upper hull 12 is constructed of one-deck thickness of sufficient height to provide space for offices and living quarters and for much of the equipment required for drilling operations, such as mud tanks, mud pump and generator. The upper and lower surfaces of the hull 12 are defined by horizontal skins 42 and 44 constructed of flat heavy steel plates welded together at their edges to form relatively smooth surfaces. The forward and side skins 46 and 48 are semicircular when viewed in vertical section and are constructed of curved steel plates welded to each other and to the upper and lower skins. The curved configuration is highly desirable from the standpoint of low wind resistance and high rigidity. Inside the hull 12 are a plurality of longitudinal and transverse watertight bulkheads 50 and 52 which are joined along their edges to the upper and lower skins. The bulkheads provide overall rigidity to the hull and serve to support the weight of loads placed on the upper skin by the pipe rack and other equipment. There are, in addition, various partition walls 54 which serve primarily to divide the space between the decks into corridors and rooms in whatever size and shape is desired. It is highly desirable, from the standpoint of stability, that large weights be concentrated near the center of buoyancy. Accordingly, the rooms allotted for mud tanks, mud pump, the main generator and auxiliary machinery are located well inboard of the sides of the hull 12 as seen in FIGURE 12. The lighter components, such as living quarters, offices and shops are located along the sides of the hull 12.

Figure 5:
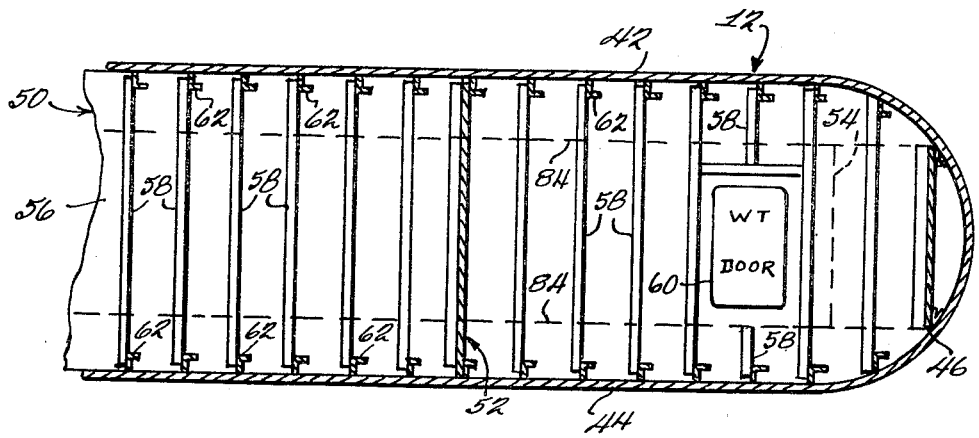
Figure 16:
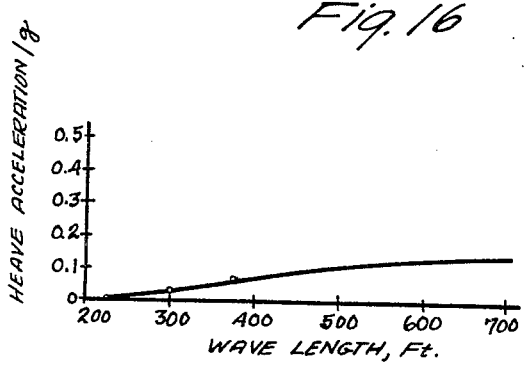
Figure 17:
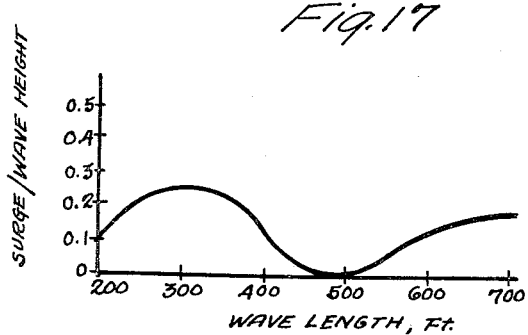
Figure 18:
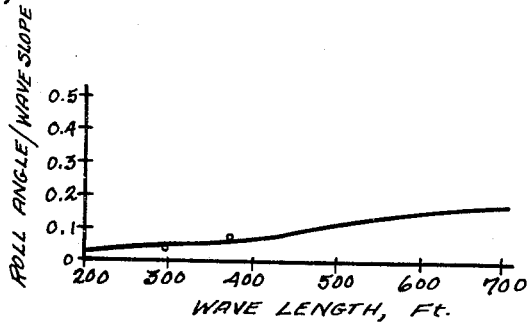
Figure 19:
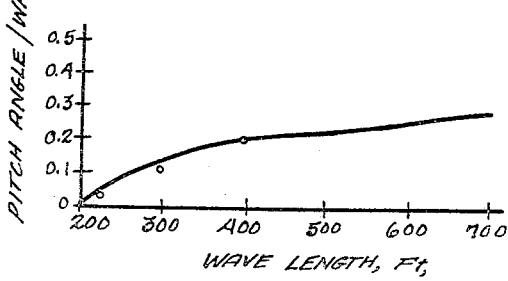
Figure 24:
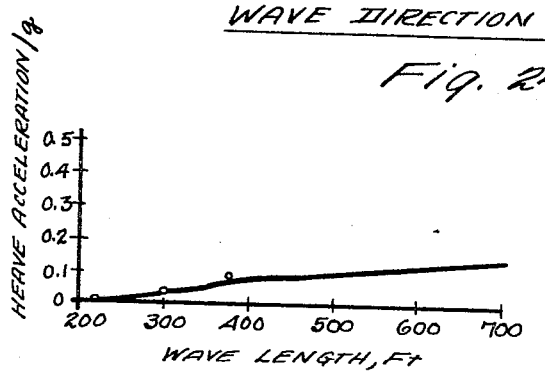
Figure 25:
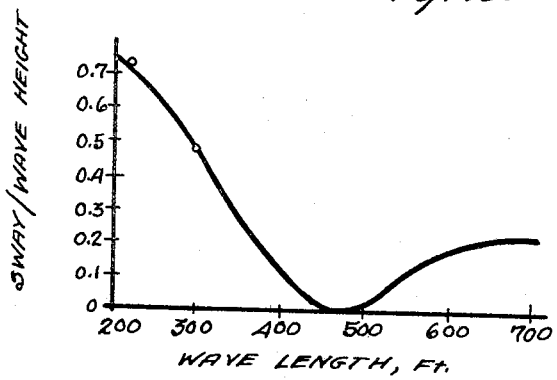
Figure 26:
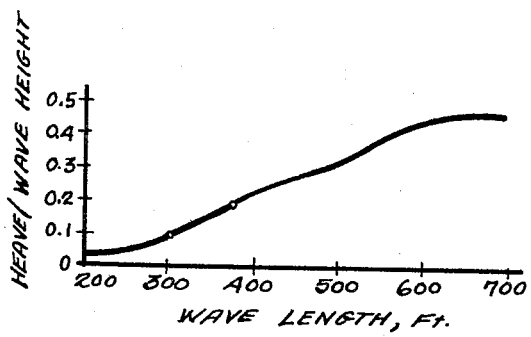
Figure 27:
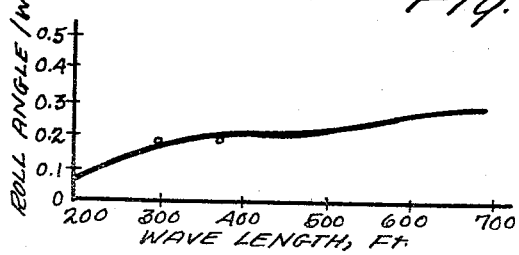

Referring to FIGURE 5, there is shown a typical longitudinal bulkhead 50 which is constructed primarily of a plurality of vertical steel plates, illustrated at 56, and a plurality of vertical L's 58 welded along one edge to the plates 56. The plates 56 are welded to the upper and lower skins 42 and 44 and to the forward skin 46 and are provided at a plurality of locations with watertight doors 60. Transverse stiffening members 62 in the form of L's are welded to the skins 42 and 44 across the entire width of the latter. The forward and side skins 46 and 48 have similar curved stiffening elements 64 and 65 welded thereto as seen in FIGURES 6 and 7 respectively.

FIGURE 6 illustrates a typical longitudinal girder 66, a plurality of which are interspersed with the longitudinal bulkheads 50 in the upper hull 12. Each girder 66 includes an upper longitudinal T structure and a lower longitudinal T structure interconnected at longitudinally spaced apart locations with vertical pipes 72. The upper T structure includes a series of longitudinally extending plates 74 welded along their upper edges to the upper skin 42 and along their lower edges to a series of longitudinally extending horizontal plates 76. Opposite the upper end of each pipe 72 is a short transverse plate 77. The lower T structure similarly includes vertical plates 78, horizontal plates 80 and transverse plates 81. The ends of the vertical pipes 72 are welded to the plates 76 and 80 and are reinforced at their lower ends with brackets 82.

FIGURE 7 illustrates a typical transverse section through the upper hull 12 between two transverse bulkheads 52. The latter are shown in FIGURES 5 and 6 as being of similar construction to the longitudinal bulkheads 50. In each of FIGURES 5, 6 and 7 the horizontal lines 84 indicate appropriate structure defining floors and ceilings for the rooms and corridors. The vertical dotted line 54 in FIGURES 5 and 6 shows a typical partition wall.

As seen in FIGURE 8, the tubes 34 which extend aft of the upper hull 12 are constructed of curved steel plates which define an outer skin 86. Internally the tubes 34 are provided with reinforcing members which render the tubes highly rigid. As shown, the reinforcing members include a plurality of longitudinally spaced apart rings each of which is constructed of an annular web 88 welded to the skin 86 and a circular flange 90 which is coaxial with the skin 86. There are also provided two longitudinal girders 92. Conveniently the center of each tube 34 provides space for a walkway 94 so that workmen can pass from the upper hull 12 into the aft columns 16 for inspection and maintenance.

The upper hull 12 is watertight and is constructed with sufficient waterplane to float the entire platform 10 in the event that all the stabilizing columns 16 become ruptured by storm or collision. The skin seams are therefore leakproof and all access openings into the hull are provided with watertight closures.

FIGURE 9 illustrates a typical horizontal section through one of the stabilizing columns 16. Each column is constructed of inner and outer watertight skins 96, 98, made up of welded-together plates, to provide an outer annular space sealed with respect to an inner space. Both spaces are maintained as permanent buoyancy chambers, the annular space serving to protect against total loss of buoyancy in the event of damage to the outer skin 98. Preferably the annular space is filled with water-insoluble foamed plastic material (not shown) to prevent flooding of that space with sea water in the event of a leak. Strength and rigidity are provided in part by a large number of vertically spaced apart annular plates 100 disposed between the inner and outer skins 96, 98 and welded thereto. In addition, a large number of angle members 102, each extending the entire length of the column 16, are welded to the inner surface of the outer skin 98 and to the outer surface of the inner skin 96. The angle members 102 pass through holes 104 in the annular plates 100 and are welded to each plate at the location of the holes 104. As shown in FIGURES 3 and 4, the upper portion of the fore and aft columns 16 are provided with an internal deck structure 106 on which windless equipment (not shown) for an anchor chain is mounted. Each anchor chain 108, shown in FIGURE 1, passes upwardly through a stowage hawse pipe 110 which is secured to the exterior of the column 16, over a fair lead 112 into the windless room through an internal hawse pipe 114 and then downwardly into the center space of the column 16 onto a second internal deck 116 structure. The upper portion of each of the center columns 16 is provided with an internal deck structure 118 so as to provide an auxiliary machinery room between the deck 118 and the upper hull 12.

The construction of the lower hull 14 is best shown in FIGURE 10. The upper and lower surfaces of the pontoons 36 are horizontal and are defined by steel plates welded together to form an upper watertight skin 120 and a lower watertight skin 122. Side skins 124 of semicylindrical shape are similarly constructed. Internally the pontoons 36 are provided with longitudinal watertight bulkheads 126, transverse watertight bulkheads 128 and various other strengthening structures which are, in general, similar to the internal members in the upper hull 12. FIGURE 10 is a typical transverse sectional view taken between two transverse bulkheads 128, the latter being shown schematically in FIGURE 13 and being of substantially the same construction as the transverse bulkheads 52 in the upper hull 12. As seen in FIGURE 10, the longitudinal bulkheads 126 are constructed of a plurality of plates 130 extending vertically between the upper and lower skins 120, 122 along the length of the pontoon 36 at the junction of the upper and lower skins with the side skins 124. Bulkhead stiffeners in the form of parallel, vertically spaced apart angle members 132 are welded to the plates 130 along the entire length of the latter. Additional longitudinal structure is provided in the form of upper and lower girders 134 which are T-shaped in section and which extend along the vertical mid-plane of the pontoon 36. The skins 120, 122 and 124 are reinforced with a plurality of parallel, longitudinally extending angles 136 welded along one edge to the inner surface of the skins.

The transversely extending internal structure of each pontoon 36 includes, in addition to the transverse bulkheads 128, a plurality of spaced apart girder structures secured to the inner surfaces of the skins 120, 122, and 124. As seen in FIGURE 10, each girder structure comprises a vertical annular web 138 welded along its outer edge to the skins 120, 122 and 124 and provided with a flange 140 at its inner edge. A vertical web 142, in the plane of the annular web 138, is welded to the outer surface of each longitudinal bulkhead and to the flange 140. In the same plane are a plurality of spoke-like I-beams 144 extending between the curved portions of flange 140 and flanges 146, the latter being carried by the vertical webs 142. Each of the webs 138 and 142 is provided with a hole 148 through which the respective angle member 132 or 136 extends.

As shown in FIGURE 11 the stabilizing cylinder 40 is constructed of a cylindrical skin 150 stiffened with circumferentially spaced internal angle members 152 which extend the length of the cylinder 40. At each of a plurality of axially spaced apart locations is an annular web 154 welded to the skin 150 and carrying a circular flange 156 on its inner edge. As in the previously illustrated constructions a hole 158 is cut in the web 154 at the location of each angle member 152, and the angle members 152 are welded to an edge of the hole 158. In addition, at each location is a spoke-like arrangement of I-beams 160 each of which is welded at its outer end to the flange 156.

FIGURES 12 and 13 illustrate in solid lines the positions of the various watertight bulkheads in the upper hull 12 and in the lower hull 14. The dotted lines in FIGURE 12 illustrate the positions of the longitudinal girders 66. As previously described, the upper hull 12 provides all the facilities for the operating crew, these facilities being indicated at 162 and including rooms for sleeping, bathing and eating, office space, shops and water distillation equipment. The hull also contains much of the machinery and equipment directly associated with drilling operations, these facilities being illustrated at 164 and including mud storage tanks, the mud pump, operating mud tanks, generators and auxiliary machinery. In the interest of greater buoyant stability the drilling facilities 164, being of much greater weight than the crew facilities 162, are located along both sides of the longitudinal midline of the platform with the heaviest equipment being disposed as close as possible to the center of flotation.

The lower hull 14 is divided by the bulkheads 126 and 128 into ballast tanks B, fuel oil tanks FO, drilling water tanks DW and pump rooms PR. The fuel oil tanks FO and drilling water tanks DW contain variable loads and are located in the stabilizing cylinder 40 near the center of flotation. The ballast tanks B in each pontoon 36 are arranged in three longitudinal rows. In operation the outer tanks are completely filled with water before the center tanks are filled so that any damage to an outer tank will not create any flooding problem. Specifically, the outer tanks when full lower the platform to a draft of 22½ feet at which 2½ feet of the lower hull remains above water. Further ballasting to a draft of 70 feet is accomplished with the center tanks. Pumps (not shown) for ballast water, drilling water and fuel oil are located in one or the other of the two pump rooms PR and are provided with suitable piping (not shown).

The improved stability and damage resistance of the platform 10 results from a combination of the structural features and arrangement of parts described above. The importance of the box girder type of construction for the hulls 12 and 14 and the columns 16 in reducing wind resistance and reducing the weight-to-strength ratio of the platform 10 has been mentioned previously. In this type of construction the strength lies in the skins and elongated angle members; the bulkheads and girders are primarily for watertight compartmentation and for supporting loads on the deck. The advantages of box girder construction apply not only to the hulls themselves but also to the platform 10 as a whole, because the platform is in essence a ring of box girders.

The shape of the lower hull 14 has several advantages. The overall shape is important in that the split construction, that is the presence of twin pontoons 36, renders the platform substantially transparent to waves when the lower hull 14 floats on the surface, provided that the spacing and proportions are proper. It has been found that the area space between the pontoons 36 should be about 50% of the total area of the two pontoons in order to avoid resonance with large waves. The presence of the bow member 38, which is constructed with a horizontal upper surface and an inclined rake surface, provides an uninterrupted forward section to longitudinal flow when the platform is under tow. This, and to an extend the presence of the stabilizing cylinder 40, eliminates the yawing tendency which is common to twin-hull structures during towing, yet it has been found to create very little drag. The combination of the bow member 38 with the stabilizing cylinder 40 produces a ring structure having high dynamic strength characteristics compared to truss type structural systems. The stabilizing cylinder 40, in addition, provides below-water space for fuel and drilling water, thereby reducing drag, and is positioned so that the center of buoyancy of the platform 10 is within 2% of the length between perpendiculars.

The shape of the pontoons 36 in transverse cross section is important from the standpoint of the motion characteristics of the platform when the latter is ballasted. The large horizontal upper and lower surfaces provide high drag to vertical motion during swells, and the semicircular sides provide low drag to horizontal motion. When partially immersed, the transverse shape has a high waterplane area for a given internal volume over a large range of drafts. The horizontal surfaces therefore function as anti-heave surfaces to reduce the tendency of the platform to rise and fall as a swell passes. This is attributable, more specifically, to the dynamic pressure created by the inertia of the water mass above or below the flat surface, and also the energy absorbed by this water being displaced in a general sideways direction.

The size, number and spacing of the stabilizing columns 16 are extremely important in increasing the natural periods of roll and pitch so as to decrease the probability of attaining resonance with large waves in the range 200–600 feet in length. The spacing of the columns 16 is important primarily from the standpoint of wave transparency. The transverse spacing between the columns 16 in the illustrated platform 10 is 158 feet, so that a 200-foot-long wave (the lower limit of the dangerous range of waves) will not peak at both columns at the same time. While a wave two times 158 feet, or 316 feet, would have a crest at one column and a trough at the other column, this situation does not produce a large heeling movement because of the different effects produced by the columns and by the anti-heave surfaces of the lower hull 14. The analysis of the overall effect is not a simple one, because the static analysis of hydrostatic forces is not a complete physical explanation; the dynamic inertia force and the hydrodynamic forces must also be considered.

The proper relative position of the columns 16 with respect to the center of gravity and center of buoyancy (C.B.) of the platform is important primarily from the standpoint of establishing a low heeling movement for a given horizontal shift in the position of a load. It can be shown by calculation that the dimensions 90 feet and 94 feet fore and aft illustrated in FIGURE 2 will result in a 5° pitch upon longitudinal movement of a 194 ton load a distance of 100 feet. If the dimensions are changed to 80 feet fore and aft, calculations show that the 194 ton load will produce a 5° pitch when moved along about 23 feet. Column position is also important in maintaining a low weight-to-strength ratio. Increasing the distance between columns increases the span of the upper hull. An increase in the span requires an almost proportionate increase in the structure of the upper hull 12, since for a given stress level the bending moment is proportional to span. Thus, a 10% (9 feet) increase in span will create a 10% increase in stress level or for the same stress will require a heavier structure. Generally speaking a range of plus or minus 5 feet in column spacing is practical; any further shift will cause either loss of stability or significant increase in structural weight.

The number of columns 16 is not limited to six and may vary from 5 up to about 8.

FIGURES 14–26 illustrate the motion characteristics of the platform 10 as verified by model tests.

It is apparent from the above discussion that the selection of the size, shape, and spacing of the members which make up a floating platform is not a straightforward task, because one desirable characteristic is often improved only at the expense of another desirable characteristic. The combination of features in the illustrated platform 10 represent an optimum balance of the variables which produces extremely good stability, low sinkage upon a change of load, high resistance to heave during swells, high natural periods of pitch and roll, low horizontal drag in wind and water, and high inherent damage resistance.

While preferred embodiments of the present invention have been described, further modifications may be made without departing from the scope of the invention.

What is claimed:

1. A floatable vessel having an upper hull structure, a lower hull structure and vertical buoyant columns intercollecting said hull structures, said vessel being free of external cross-bracing and being adapted in an unballasted condition to float with said lower hull structure partially submerged and in a ballasted condition to float in a motion-resisting manner with said lower hull fully submerged and said buoyant columns partially submerged, said upper hull structure being constructed in the form of a horizontally flat watertight box of one-deck thickness which resists distortion by dynamic forces created by wind and water action on said vessel, the resistance to distortion being derived from a first horizontal deck plate which defines the top of said box, a second horizontal deck plate spaced below said first deck plate and defining the bottom of said box and side and end plates, said side and end plates being rigidly connected along their upper and lower edges to said first and second horizontal plates and being rigidly connected to each other along their other edges, said watertight box being divided interiorly by at least one longitudinal bulkhead and at least one transverse bulkhead so as to form watertight compartments and so as to support loads placed on said first deck plate;

said buoyant columns having upper ends in engagement with and rigidly connected to said upper hull structure near the periphery thereof, said columns being sealed from said upper and lower hull structures to prevent passage of fluid;

said lower hull structure being in engagement with and rigidly connected to the lower ends of said columns and being constructed in the form of a flat shape which resists distortion by dynamic forces created by wind and water action on said vessel and which resists vertical heaving motions of said vessel during the rise and fall of waves, said lower hull structure including at least two horizontally spaced apart flat watertight box-like units which define a plurality of ballast tanks, each unit having a flat horizontal upper surface and a flat horizontal lower surface, said lower hull structure further including transverse horizontally extending first and second supporting members horizontally spaced from each other and rigidly interconnecting said box-like units, each of said supporting members being constructed in watertight box-like form.

2. A floatable vessel as in claim 1 wherein said columns form at least two groups, the columns in each group being arranged in straight parallel lines.

3. A floatable vessel as in claim 1 wherein one of said transverse box-like supporting members connecting said box-like units of said lower hull structure has a horizontal upper surface and a flat lower surface which is inclined downwardly and inwardly relative to said vessel, said supporting member being disposed at one end of said box-like units thereby serving as a rake-type bow for said vessel when in an unballasted condition.

4. A floatable vessel as in claim 1 wherein said lower hull is defined by two horizontally elongated box-like units and two transverse supporting members, one of said supporting members connecting the ends of said box-like units and the other of said supporting members connecting said box-like units intermediate their ends.

5. A floatable vessel having an upper hull structure, a lower hull structure and vertical buoyant columns interconnecting said hull structures, said vessel being free of external cross-bracing and being adapted in an unballasted condition to float with said lower hull structure partially submerged and in a ballasted condition to float in a motion-resisting manner with said lower hull fully submerged and said buoyant columns partially submerged, said upper hull structure being constructed in the form of a horizontally flat watertight box of one-deck thickness which resists distortion by dynamic forces created by wind and water action on said vessel, the resistance to distortion being derived from a first horizontal deck plate which defines the top of said box, a second horizontal deck plate spaced below said first deck plate and defining the bottom of said box and side and end plates, said side and end plates being rigidly connected along their upper and lower edges to said first and second horizontal plates and being rigidly connected to each other along their other edges, said watertight box being divided interiorly by at least one longitudinal bulkhead and at least one transverse bulkhead so as to form watertight compartments and so as to support loads placed on said first deck plate;

said buoyant columns being at least five and not more than about eight in number and being horizontally spaced apart, said columns having upper ends in engagement with and rigidly connected to said upper hull structure near the periphery thereof, the transverse cross section of said columns being circular in shape and continuously decreasing in area from the lower ends of said columns to said upper ends, said columns being sealed from said upper and lower hull structures to prevent passage of fluid;

said lower hull structure being in engagement with and rigidly connected to the lower ends of said columns and being constructed in the form of a flat shape which resists distortion by dynamic forces created by wind and water action on said vessel and which resists vertical heaving motions of said vessel during the rise and fall of waves, said lower hull structure including at least two horizontally spaced apart flat watertight box-like units which define a plurality of ballast tanks, each unit having a flat horizontal upper surface and a flat horizontal lower surface, said lower hull structure further including transverse horizontally extending first and second supporting members horizontally spaced from each other and rigidly interconnecting said box-like units, each of said supporting members being constructed in watertight box-like form.

References Cited
UNITED STATES PATENTS 3,294,051 12/1966 Khelstovsky _____ 114—.5
3,397,545 8/1968 Leavitt _____ 114—.5

TRYGVE M. BLIX, Primary Examiner

U.S. Cl. X.R.
61—46.5